(12) United States Patent
Strieter et al.

(10) Patent No.: US 7,899,033 B2
(45) Date of Patent: Mar. 1, 2011

(54) METHOD AND SYSTEM FOR CONDITIONALLY INVOKING AN IMS SERVICE

(75) Inventors: Christopher J. Strieter, Edwardsville, IL (US); Stephen W. Gevers, Edwardsville, IL (US)

(73) Assignee: AT&T Intellectual Property I, L.P., Reno, NV (US)

( * ) Notice: Subject to any disclaimer, the term of this patent is extended or adjusted under 35 U.S.C. 154(b) by 1224 days.

(21) Appl. No.: 11/509,317

(22) Filed: Aug. 24, 2006

(65) Prior Publication Data

US 2008/0063176 A1 Mar. 13, 2008

(51) Int. Cl.
*H04L 12/66* (2006.01)
(52) U.S. Cl. .................. 370/352; 370/401; 370/466; 455/445; 455/458; 455/461; 379/211.01; 379/211.02; 709/224; 709/227
(58) Field of Classification Search .............. 370/352; 709/224, 227
See application file for complete search history.

(56) References Cited

U.S. PATENT DOCUMENTS

| | | | |
|---|---|---|---|
| 5,734,977 A | 3/1998 | Sanmugam | |
| 5,920,820 A | 7/1999 | Qureshi et al. | |
| 6,097,945 A | 8/2000 | Evensen et al. | |
| 6,134,316 A | 10/2000 | Kallioniemi et al. | |
| 6,603,973 B1 * | 8/2003 | Foladare et al. ............. | 455/445 |
| 6,693,897 B1 | 2/2004 | Huang | |
| 6,822,954 B2 | 11/2004 | McConnell et al. | |
| 6,999,577 B2 | 2/2006 | Wang et al. | |
| 7,664,237 B1 * | 2/2010 | Croak et al. ............. | 379/90.01 |
| 2003/0061365 A1 | 3/2003 | White et al. | |
| 2003/0095540 A1 * | 5/2003 | Mulligan et al. ............. | 370/352 |
| 2003/0131073 A1 | 7/2003 | Lucovsky et al. | |
| 2004/0006623 A1 * | 1/2004 | Gourraud et al. ............. | 709/227 |
| 2004/0194116 A1 | 9/2004 | McKee et al. | |
| 2004/0218585 A1 | 11/2004 | Huang | |
| 2004/0236836 A1 | 11/2004 | Appelman et al. | |
| 2004/0254998 A1 | 12/2004 | Horvitz | |
| 2005/0018833 A1 | 1/2005 | Wang et al. | |
| 2005/0021540 A1 | 1/2005 | McKee et al. | |
| 2005/0059384 A1 | 3/2005 | Kuusinen et al. | |
| 2005/0074107 A1 | 4/2005 | Renner et al. | |
| 2005/0100145 A1 | 5/2005 | Spencer et al. | |
| 2005/0123118 A1 * | 6/2005 | Terry et al. ............. | 379/211.02 |
| 2005/0170861 A1 | 8/2005 | Niemi et al. | |
| 2006/0077956 A1 | 4/2006 | Saksena et al. | |
| 2006/0077957 A1 | 4/2006 | Reddy et al. | |
| 2006/0095524 A1 | 5/2006 | Kay et al. | |
| 2006/0104306 A1 | 5/2006 | Adamczyk et al. | |
| 2006/0288099 A1 * | 12/2006 | Jefferson et al. ............. | 709/224 |

* cited by examiner

*Primary Examiner*—Curtis Kuntz
*Assistant Examiner*—Joseph J Nguyen
(74) *Attorney, Agent, or Firm*—Toler Law Group

(57) ABSTRACT

A pushed value associated with a party is received by a telephone network element. The pushed value is a function of a plurality of pushed values associated with the party. An incoming call for the party is received after receiving the pushed value. An Internet Protocol Multimedia Subsystem (IMS) service for the incoming call is conditionally invoked based on the pushed value.

29 Claims, 4 Drawing Sheets

US 7,899,033 B2

METHOD AND SYSTEM FOR CONDITIONALLY INVOKING AN IMS SERVICE

FIELD OF THE DISCLOSURE

The present disclosure is generally related to telecommunication services.

BACKGROUND

Internet Protocol Multimedia Subsystem (IMS) is an emerging standard by 3GPP within the telecommunication industry. IMS can be used by telecommunication service providers to provide Internet Protocol (IP)-based services to their customers.

DETAILED DESCRIPTION OF THE DRAWINGS

Disclosed herein are embodiments of methods and systems that control a condition on which an Internet Protocol Multimedia Subsystem (IMS) service is invoked for an incoming call. The conditional invocation of the IMS service is based on an evaluation of a plurality of values prior to receiving the incoming call. In an embodiment, prior to receiving the incoming call, the plurality of values are pushed to an event notification system using a subscribe/notify process, and the event notification system determines a value, such as a Boolean value, based on the plurality of values. The plurality of values can be based on any number of factors, and the Boolean value can be based on any arbitrarily-complex Boolean expression or function of the values. The factors may comprise persisted data.

Outside of any call flow, the event notification system uses a subscribe/notify process to notify an entity of the Boolean value and any updates thereto. The entity, such as a telephone network element, subscribes to the event notification system and controls the conditional invocation of the IMS service based on the Boolean value. When one or more of the factors change, one or more new values are pushed to the event notification system using the subscribe/notify process. The event notification system, in turn, recalculates the Boolean value based on the one or more new values. If a different Boolean value results from the recalculation, the event notification system pushes the new Boolean value to the telephone network element. When an incoming call is received, the telephone network element uses a most-recently-pushed Boolean value to determine whether or not to invoke the IMS service for the incoming call. The IMS service resides on a call path associated with the incoming call, e.g. a call path between a caller and a callee, and influences a call flow based on the most-recently-pushed Boolean value. In an embodiment, the subscribe/notify process is based on a subscribe/notify model as defined in RFC 3265.

By limiting a number of service invocations and by determining a value that indicates whether or not to invoke the IMS-based service before receiving an incoming call, embodiments can produce increased efficiency in call flow logic. Embodiments further reduce a latency of calls and increase a call capacity. Embodiments can be used by telecommunication companies to design and implement various IMS-based services.

Figure 1:
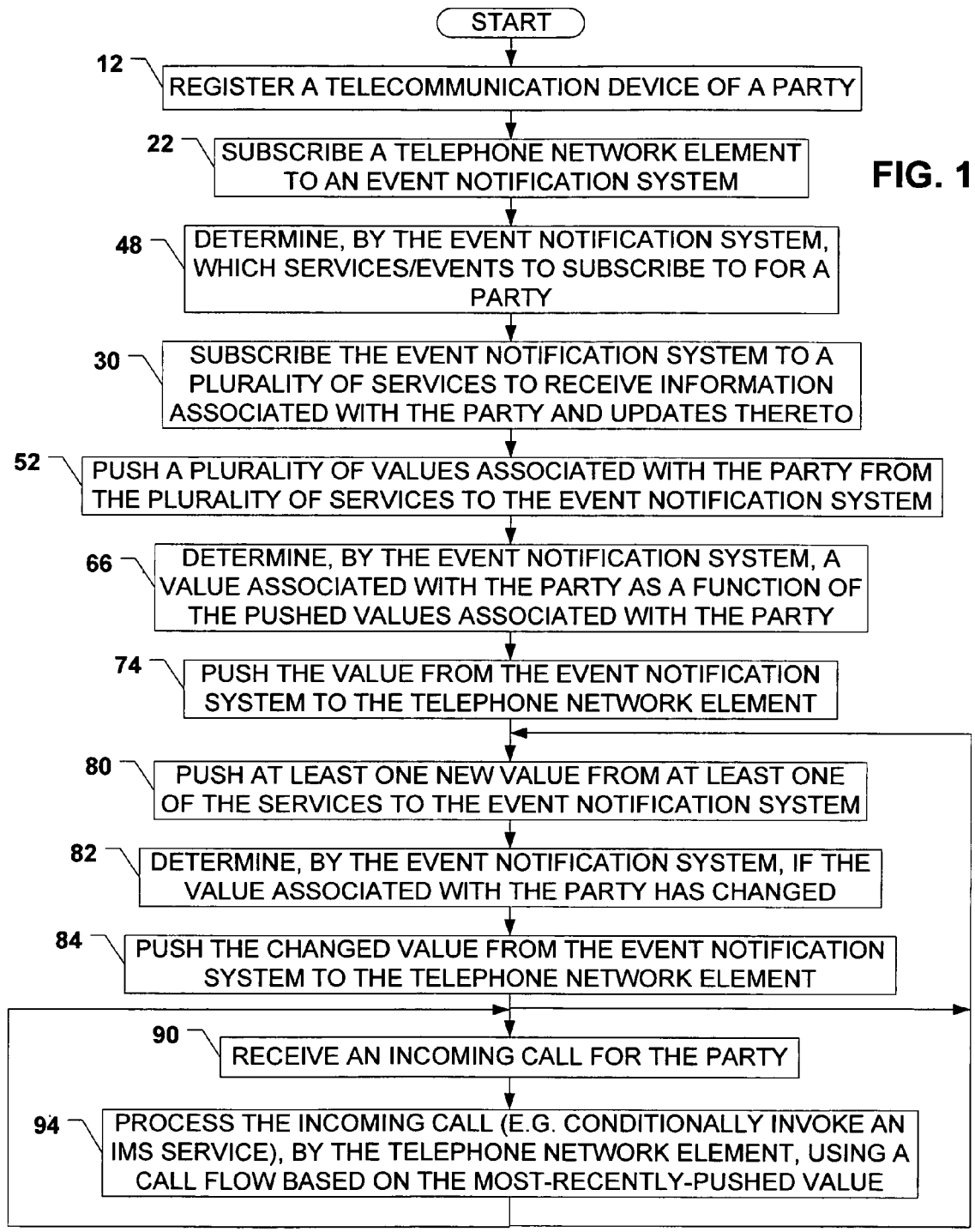
FIG. 1 is a flow chart of an embodiment of a method of conditionally invoking an IMS service.

Embodiments are described with reference to FIG. 1, which is a flow chart of an embodiment of a method of conditionally invoking an IMS service 10, and FIG. 2, which is a system for conditionally invoking the IMS service 10.

As indicated by block 12, the method comprises registering a telecommunication device 14 of a party 16. The telecommunication device 14 may comprise a telephone, for example. The telecommunication device 14 is registered using a telecommunication network element 20 that provides a telephone service thereto. The telecommunication device 14 may be registered in response to being powered on.

As indicated by block 22, the method comprises subscribing the telephone network element 20 to an event notification system 24 to receive information associated with the party 16, and to subsequently receive updates to the information associated with the party 16. The telephone network element 20 subscribes for the information associated with the party 16 by sending a subscribe message 26 to the event notification system 24. In an embodiment, the event notification system 24 acts as an expression handler and provides an availability service that provides availability information associated with the party 16.

As indicated by block 30, the method comprises subscribing the event notification system 24 to a plurality of services to receive information associated with the party 16, and to subsequently receive updates to the information associated with the party. The event notification system 24 subscribes for the information associated with the party 16 by sending a respective subscribe message to each of the plurality of services. For purposes of illustration and example, the event notification system 24 is shown in FIG. 2 to subscribe to three services 32, 34 and 36 by sending thereto subscribe messages 42, 44 and 46, respectively. Those having ordinary skill will recognize that the event notification system 24 generally can subscribe to any number of services.

Optionally, as indicated by block 48, the method may comprise determining which services may generate events associated with the party 16, and determining which events generated via those services that the event notification service is to subscribe. The event notification system 24 may access a database 50 of subscriber data to determine which events/services are to be subscribed for the party 16. In an embodiment, the database 50 either comprises or is similar to a home subscription server (HSS) database. Alternative data stores of subscriber data are also contemplated for the database 50.

As indicated by block 52, the method comprises pushing a plurality of values associated with the party 16 from the plurality of services to the event notification system 24. The plurality of values may be pushed in a plurality of notify messages. For purposes of illustration and example, the service 32 pushes a value 54 in a notify message 56, the service 34 pushes a value 60 in a notify message 62, and the service 36 pushes a value 64 in a notify message 66. The event notification system 24 receives the values 54, 60 and 64 and stores these as pushed values 54', 60' and 64'.

In an embodiment, the services 32, 34 and 36 initially send the notify messages 56, 62 and 66 in response to the subscribe messages 42, 44 and 46, respectively, regardless of whether or not any state changes associated with the party 16 have occurred. Thereafter, as subsequently described with reference to block 80, subsequent notify messages are sent by the services 32, 34 and 36 only as state changes occur.

In an embodiment, the values 54 and 60 provide busy/not-busy indications for the party 16. For example, the value 54 may indicate if the party 16 is busy or not-busy based on a do-not-disturb feature for his/her telecommunication device 14. The value 60 may indicate if the party 16 is busy or not-busy based on any events scheduled in his/her calendar for a current time and date. The value 64 may provide an override used to override an otherwise busy or not-busy indication.

As indicated by block 66, the method comprises determining, by the event notification system 24, a value 70 associated with the party 16 based on the plurality of pushed values associated with the party 16. The value 70 is determined as a function 72 of the pushed values, e.g. a function of the pushed values 54', 60' and 64'. The function 72 may comprise a Boolean function of the pushed values, and the value 70 may comprise a Boolean value. In an embodiment, the value 70 indicates whether the party 16 is available or unavailable to receive incoming calls based on one or more busy/not-busy indicators and an override indicator.

As indicated by block 74, the method comprises pushing the value 70 from the event notification system 24 to the telephone network element 20. The value 70 may be pushed in a notify message 76. The telephone network element 20 receives the value 70 and stores this as a pushed value 70'.

If a state change occurs in any of the values 54, 60 or 64, the respective service 32, 34 or 36 that provides the value automatically pushes a new value associated with the party 16 to the event notification system 24. For example, responsive to a state change in the value 64, the service 34 automatically pushes a new value to the event notification system 24 in a subsequent notify message. This potential act of pushing at least one new value associated with the party 16 from at least one of the services to the event notification system 24 in at least one notify message is indicated by block 80. The event notification system 24 determines if the at least one new value pushed thereto, when applied to the function 72, causes a change in the value 70. This potential act of determining, by the event notification system 24, a change in the value 70 associated with the party 16 based on the at least one new value associated with the party 16 is indicated by block 82. As indicated by block 84, if the value 70 has changed, the changed value 70 is automatically pushed from the event notification system 24 to the telephone network element 20 in a notify message. The telephone network element receives the changed value 70 and stores same as the pushed value 70'.

As indicated by block 90, the method comprises receiving, by the telephone network element 20, an incoming call 92 for the party 16.

As indicated by block 94, the method comprises processing the incoming call 92, by the telephone network element 20, using a call flow based on the pushed value 70'. Again, the pushed value 70' is associated with the party 16 and was pushed to the telephone network element 20 by the event notification system 24 prior to receiving the incoming call 92. The act of processing the incoming call 92 may comprise determining whether or not to invoke the IMS service 10 based on the pushed value 70'. If invoked, the IMS service 10 resides on a call path and influences a call flow associated with the incoming call 92. Based on the pushed value 70', a decision element 96 determines whether or not to invoke the IMS service 10 for the incoming call 92.

In an embodiment, the decision element 96 invokes the IMS service 10 if the pushed value 70' indicates that the party 16 is unavailable, and does not invoke the IMS service 10 if the pushed value 70' indicates that the party 16 is available. This embodiment is of interest, for example, when the IMS service 10 comprises a white list service that enables a caller that is on a white list of the party 16 to have his/her call sent to the telecommunication device 14 of the party 16 even if the party 16 is deemed unavailable based on the pushed value 70'. If the party 16 is deemed unavailable based on the pushed value 70' and if the caller is not on the white list of the party 16, the call is inhibited from being sent to the telecommunication device 14 of the party 16.

The method can flow back to block 90, wherein a subsequent incoming call is received for the party 16, or to block 80, wherein at least one new value from at least one of the services is pushed to the event notification system 24.

Figure 2:
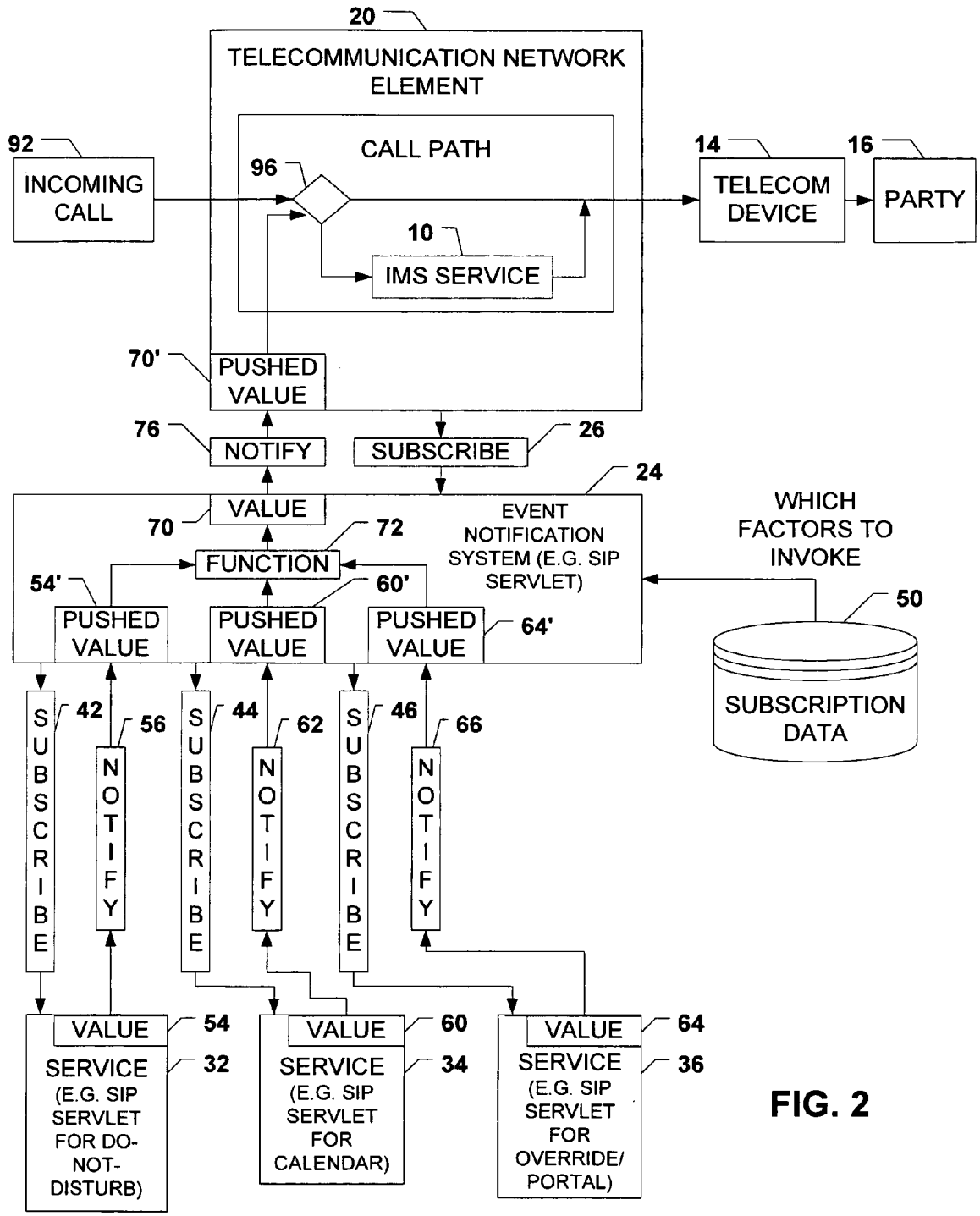
FIG. 2 is a block diagram of an embodiment of a system for conditionally invoking an IMS service.
Figure 3:
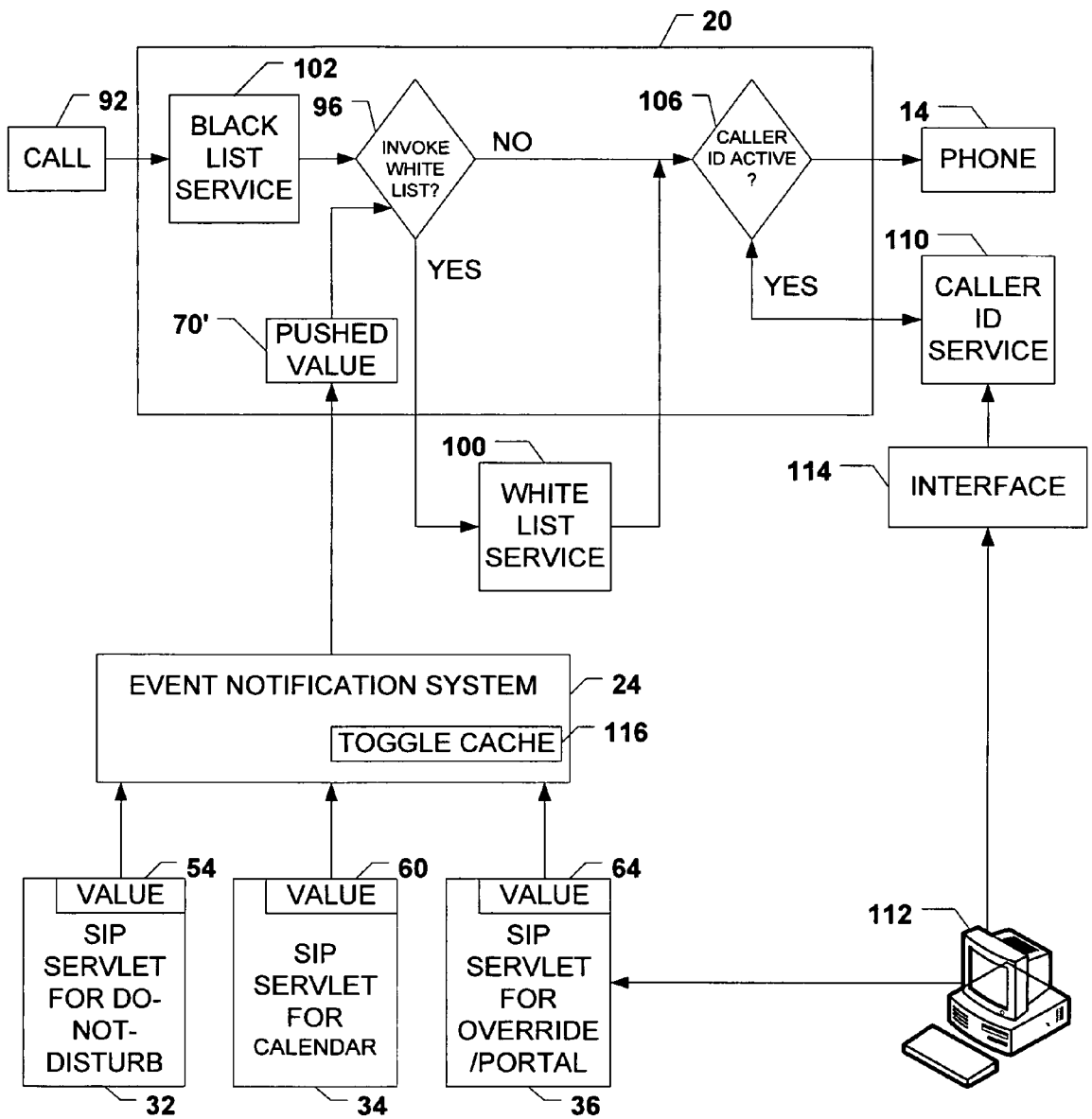
FIG. 3 is a block diagram of an embodiment of a system for conditionally invoking a white list service.

FIG. 3 is a block diagram of an embodiment of a system for conditionally invoking a white list service 100 using elements of FIG. 2. A black list service 102 is invoked for the incoming call 92 independent of the pushed value 70'. The black list service 102 may be always invoked or substantially always invoked for incoming calls to the party 16. The black list service 102 blocks all calls originating from callers on a black list of the party 16.

If the black list service 102 has not blocked the incoming call 92, a decision element 96 conditionally invokes the white list service 100 when the party 16 is reported as being "busy" based on the pushed value 70'. The pushed value 70' indicates that the party 16 is busy if a most-recently pushed value from the do-not-disturb service 32 indicates that the party 16 is busy or if a most-recently pushed value from the calendar service 34 indicates that the party 16 is busy, and if a most-recently pushed value from the service 36 is not an override value. Therefore, prior to receiving the incoming call 92, a decision has effectively been made within the telephone network element 20 on whether or not to invoke the white list service 100. The telephone network element 20 may comprise a Service Capability Interactive Manager (SCIM), a Serving Call Session Control Function (S-CSCF), an HSS, or any combination thereof for example.

If invoked, the white list service 100 blocks the incoming call 92 if the caller is not on the white list of the party 16 and the party 16 is currently busy, and forwards the incoming call 92 to the party 16 if the caller is on the white list of the party 16. Optionally, the incoming call is processed by an element 106 which determines if caller identification is active. If the caller identification is active, a caller identification service 110 is accessed. The party 16 or another user can use a computer 112 to communicate with the caller identification service 110 via an interface 114. An example of the interface 114 is one by Leapstone Systems, Inc.

The party 16 or another user can use the computer 112 to communicate with the service 36 to change his/her override setting as represented by the value 64. The service 36 may enable the party 16 or other user to toggle either from do-not-override to override, or from override to do-not-override. Once the value 64 has been changed, the service 36 pushes the value 64 to the event notification system 24. The event notification system 24, in turn, receives and stores the value 64 as the pushed value 64'. The event notification system 24 may comprise a toggle cache 116 to cache the pushed value 64'. The event notification system 24 determines if an expression to answer the question "do we invoke the white list service?", as represented by the function 72, has produced a new result based on the new data pushed thereto. If so, the event notification system 24 pushes the new result to the telephone network element 20, which is stored as the pushed value 70'. Thus, the telephone network element 20 automatically receives updated data (which may change periodically or otherwise from time-to-time) without having to request it.

If an S-CSCF is incapable of receiving notification messages, the event notification system can send the notifications messages to an HSS. The HSS, in turn, may be accessed by the S-CSCF to determine whether or not a service is conditionally invoked.

Embodiments of the method and system for conditionally invoking an IMS service may be used in various services either in addition to or as an alternative to the white list service. For example, a service may be constructed that limits an amount of time (e.g. a number of minutes) that a party (e.g. a teenager) can use (e.g. talk on) the phone over a specific time period. Once the amount of time associated with the party has reached a threshold, the service may limit the party to a predetermined set of numbers to which he/she can place outgoing calls. The predetermined set of numbers may comprise an emergency number (e.g. 911), a home phone number, and one or more parents' cell phone numbers. The event notification system 24 may determine a Boolean value based on the amount of time used by the party in the specific time period, and push the Boolean value to a controlling entity that conditionally invokes the service based on the Boolean value. Another service may use the same information, but limit the party to calling at particular times of the day.

In general, any of the herein-disclosed pushed values associated with a party may be associated with a particular telephone number of the party, and/or associated with a particular name of the party, and/or associated with a particular person wherein the party comprises the particular person.

Figure 4:
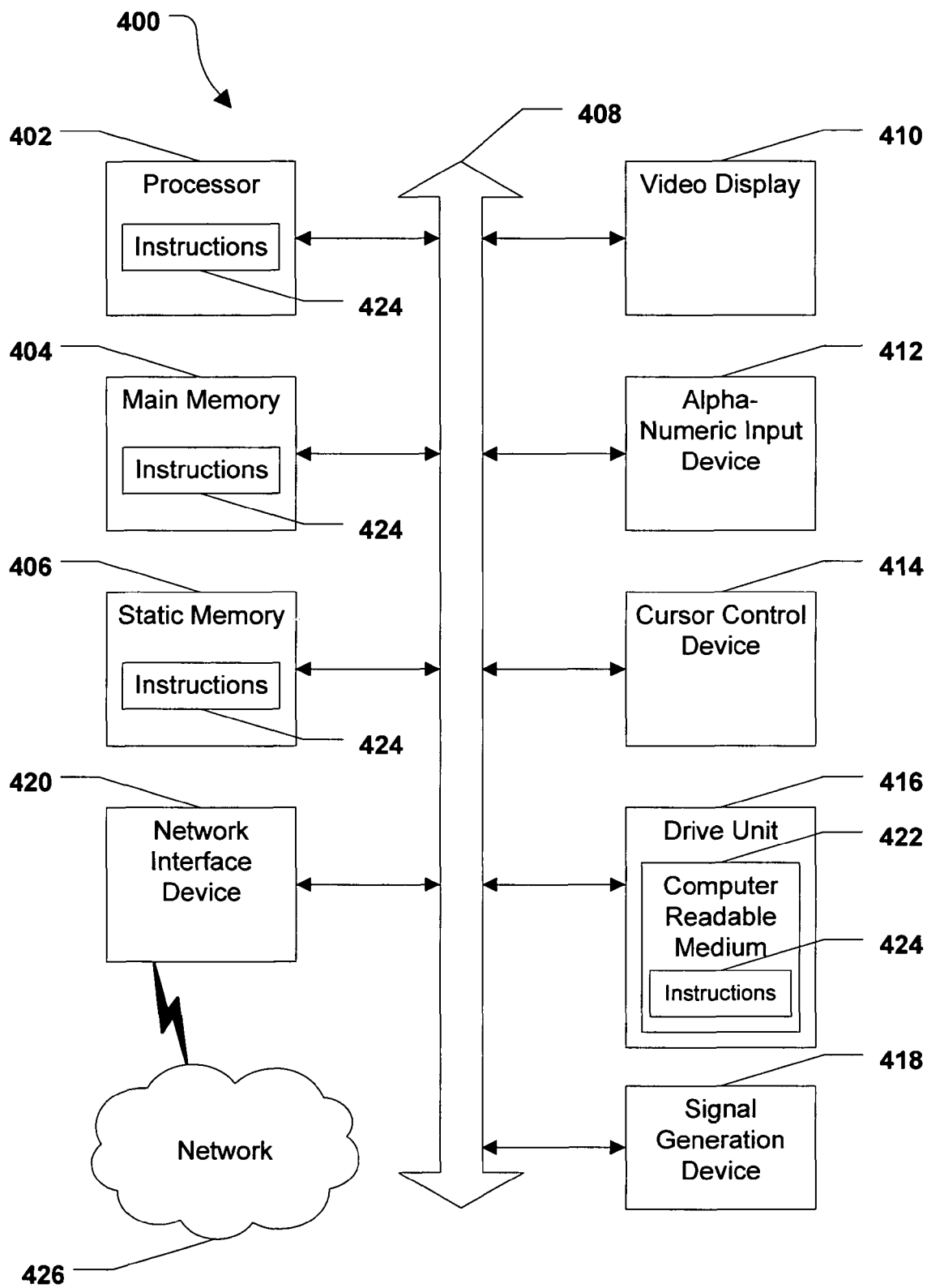
FIG. 4 is a block diagram of an illustrative embodiment of a general computer system.

Referring to FIG. 4, an illustrative embodiment of a general computer system is shown and is designated 400. The computer system 400 can include a set of instructions that can be executed to cause the computer system 400 to perform any one or more of the methods or computer based functions disclosed herein. The computer system 400 may operate as a standalone device or may be connected, e.g., using a network, to other computer systems or peripheral devices.

In a networked deployment, the computer system may operate in the capacity of a server or as a client user computer in a server-client user network environment, or as a peer computer system in a peer-to-peer (or distributed) network environment. The computer system 400 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 400 can be implemented using electronic devices that provide voice, video or data communication. Further, while a single computer system 400 is illustrated, the term "system" shall also be taken to include any collection of systems or sub-systems that individually or jointly execute a set, or multiple sets, of instructions to perform one or more computer functions.

As illustrated in FIG. 4, the computer system 400 may include a processor 402, e.g., a central processing unit (CPU), a graphics processing unit (GPU), or both. Moreover, the computer system 400 can include a main memory 404 and a static memory 406, that can communicate with each other via a bus 408. As shown, the computer system 400 may further include a video display unit 410, such as a liquid crystal display (LCD), an organic light emitting diode (OLED), a flat panel display, a solid state display, or a cathode ray tube (CRT). Additionally, the computer system 400 may include an input device 412, such as a keyboard, and a cursor control device 414, such as a mouse. The computer system 400 can also include a disk drive unit 416, a signal generation device 418, such as a speaker or remote control, and a network interface device 420.

In a particular embodiment, as depicted in FIG. 4, the disk drive unit 416 may include a computer-readable medium 422 in which one or more sets of instructions 424, e.g. software, can be embedded. Further, the instructions 424 may embody one or more of the methods or logic as described herein. In a particular embodiment, the instructions 424 may reside completely, or at least partially, within the main memory 404, the static memory 406, and/or within the processor 402 during execution by the computer system 400. The main memory 404 and the processor 402 also may include computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions 424 or receives and executes instructions 424 responsive to a propagated signal, so that a device connected to a network 426 can communicate voice, video or data over the network 426. Further, the instructions 424 may be transmitted or received over the network 426 via the network interface device 420.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method comprising:
   receiving a pushed value associated with a party at a telecommunication network element from an event notification system, the pushed value being a function of a plurality of service pushed values associated with the party;
   receiving an incoming call for the party at the telecommunication network element after receiving the pushed value;
   conditionally invoking, with the telecommunication network element, an Internet Protocol Multimedia Subsystem (IMS) service for the incoming call based on the pushed value; and
   sending a subscribe message to the event notification system from the telecommunication network element, wherein, in response to the subscribe message, the event notification system:
   sends a plurality of subscribe messages from the event notification system to a plurality of services;
   receives a plurality of notification messages from the plurality of services, the plurality of notification messages comprising the plurality of service pushed values;
   determines the pushed value associated with the party as the function of the service pushed values; and
   pushes, to the telecommunication element, the pushed value in a notification message.

2. The method of claim 1 wherein the IMS service comprises a white list service.

3. The method of claim 2 wherein the white list service is conditionally invoked based on the pushed value indicating that the party is busy.

4. The method of claim 2 further comprising:
   invoking a black list service for the incoming call independent of the pushed value.

5. The method of claim 1 wherein the pushed value indicates an availability of the party.

6. The method of claim 1 wherein the plurality of service pushed values are pushed from a plurality of servlets.

7. The method of claim 1 wherein the plurality of service pushed values comprise a first value pushed from a do-not-disturb service, a second value pushed from a calendar service and a third value pushed from an override service.

8. The method of claim 1 wherein the IMS service influences a call flow of the incoming call.

9. The method of claim 1 wherein the IMS service limits an amount of time that the party can use a phone that receives the incoming call over a specific time period.

10. The method of claim 1 wherein the party comprises a person, and wherein the pushed value is associated with the person.

11. The method of claim 1 wherein the pushed value is associated with a telephone number of the party.

12. The method of claim 1 wherein the pushed value is associated with a name of the party.

13. A system comprising:
   a telephone network element to receive a pushed value associated with a party, the pushed value being a function of a plurality of pushed values associated with the party, the telephone network element to receive an incoming call for the party after receiving the pushed value, the telephone network element to conditionally invoke an Internet Protocol Multimedia Subsystem (IMS) service for the incoming call based on the pushed value;

wherein the telephone network element sends a subscribe message to an event notification system for the party, wherein the event notification system sends a plurality of subscribe messages to a plurality of services for the party, wherein the event notification system receives the plurality of pushed messages as a plurality of notification messages from the services, wherein the event notification system determines the pushed value associated with the party as the function of the plurality of pushed values, and wherein the event notification system pushes the pushed value in a notification message to the telephone network element.

14. The system of claim 13 wherein the IMS service comprises a white list service.

15. The system of claim 14 wherein the white list service is conditionally invoked based on the pushed value indicating that the party is busy.

16. The system of claim 14 wherein the telephone network element is to invoke a black list service for the incoming call independent of the pushed value.

17. The system of claim 13 wherein the pushed value indicates an availability of the party.

18. The system of claim 13 wherein the plurality of pushed values are pushed from a plurality of servlets.

19. The system of claim 13 wherein the plurality of pushed values comprise a first value pushed from a do-not-disturb service, a second value pushed from a calendar service and a third value pushed from an override service.

20. The system of claim 13 wherein the IMS service influences a call flow of the incoming call.

21. The system of claim 13 wherein the IMS service limits an amount of time that the party can use a phone that receives the incoming call over a specific time period.

22. The system of claim 13 wherein the party comprises a person, and wherein the pushed value is associated with the person.

23. The system of claim 13 wherein the pushed value is associated with a telephone number of the party.

24. The system of claim 13 wherein the pushed value is associated with a name of the party.

25. A non-transitory computer-readable medium comprising computer-readable instructions that cause a computer to:
   receive a pushed value associated with a party from an event notification system, the pushed value being a function of a plurality of pushed values associated with the party;
   receive an incoming call for the party after receiving the pushed value;
   conditionally invoke an Internet Protocol Multimedia Subsystem (IMS) service for the incoming call based on the pushed value; and
   invoke a black list service for the incoming call independent of the pushed value;
   wherein the plurality of pushed values comprise a first value pushed from a do-not-disturb service, a second value pushed from a calendar service and a third value pushed from an override service;
   wherein the pushed value indicates that the party is busy based on the first value, the second value and the third value; and
   wherein the IMS service comprises a white list service that is conditionally invoked based on the pushed value indicating that the party is busy.

26. The non-transitory computer-readable medium of claim 25 wherein the IMS service limits an amount of time that the party can use a phone that receives the incoming call over a specific time period.

27. The non-transitory computer-readable medium of claim 25 wherein the party comprises a person, and wherein the pushed value is associated with the person.

28. The non-transitory computer-readable medium of claim 25 wherein the pushed value is associated with a telephone number of the party.

29. The non-transitory computer-readable medium of claim 25 wherein the pushed value is associated with a name of the party.

* * * * *